(12) United States Patent
Palmer et al.

(10) Patent No.: US 11,889,003 B2
(45) Date of Patent: Jan. 30, 2024

(54) UNIT VERIFICATION METHOD AND DEVICE

(71) Applicant: TTP Plc., Royston (GB)

(72) Inventors: Timothy John Palmer, Royston (GB); Michael Beck, Royston (GB)

(73) Assignee: TTP Plc, Royston (GB)

( * ) Notice: Subject to any disclaimer, the term of this patent is extended or adjusted under 35 U.S.C. 154(b) by 0 days.

(21) Appl. No.: 17/641,757

(22) PCT Filed: Sep. 10, 2020

(86) PCT No.: PCT/GB2020/052173
§ 371 (c)(1),
(2) Date: Mar. 9, 2022

(87) PCT Pub. No.: WO2021/048546
PCT Pub. Date: Mar. 18, 2021

(65) Prior Publication Data
US 2022/0360455 A1 Nov. 10, 2022

(30) Foreign Application Priority Data

Sep. 10, 2019 (GB) .................................. 1913058

(51) Int. Cl.
*H04L 9/32* (2006.01)
*H04L 9/08* (2006.01)

(52) U.S. Cl.
CPC .......... *H04L 9/3278* (2013.01); *H04L 9/0861* (2013.01)

(58) Field of Classification Search
CPC ........................... H04L 9/3278; H04L 9/0861
See application file for complete search history.

(56) References Cited

U.S. PATENT DOCUMENTS

| | | | |
|---|---|---|---|
| 6,283,464 B1* | 9/2001 | Byers ................... | G01R 1/0466 269/903 |
| 8,427,193 B1* | 4/2013 | Trimberger .......... | H03K 19/003 326/38 |
| 11,271,759 B2* | 3/2022 | Cambou ............... | H04L 9/0643 |
| 2003/0204743 A1* | 10/2003 | Devadas ................ | G06F 21/72 257/E23.179 |
| 2006/0109015 A1* | 5/2006 | Thacker ................... | G02B 6/12 324/755.07 |
| 2008/0141364 A1* | 6/2008 | Skoric ...................... | G09C 1/00 726/20 |
| 2009/0083833 A1* | 3/2009 | Ziola ........................ | G06F 21/31 726/2 |

(Continued)

OTHER PUBLICATIONS

PCT Patent Application PCT/GB2020/052173 International Search Report and Written Opinion dated Nov. 17, 2020.

(Continued)

*Primary Examiner* — Darshan I Dhruv
(74) *Attorney, Agent, or Firm* — Erise IP, P.A.

(57) ABSTRACT

A unit verification method to be performed on a unit under test (UUT) comprises connecting a verification device to the UUT. The verification device applies a set of challenge signals to the UUT and then measures the responses of the UUT to the challenge signals. The responses of the UUT are based on the challenge signals and the physical properties of the UUT. A registration key is generated based on the measured responses and is stored. The registration key is unique to the UUT.

20 Claims, 3 Drawing Sheets

(56) References Cited

U.S. PATENT DOCUMENTS

| | | | | |
|---|---|---|---|---|
| 2011/0096955 A1* | 4/2011 | Voloshynovskiy | ... | G07F 7/0813 382/103 |
| 2012/0033810 A1* | 2/2012 | Devadas | ... | G06F 21/31 380/46 |
| 2013/0051552 A1* | 2/2013 | Handschuh | ... | H04L 9/0897 380/44 |
| 2014/0047238 A1* | 2/2014 | Harty | ... | H04L 9/3239 713/168 |
| 2014/0189890 A1* | 7/2014 | Koeberl | ... | G09C 1/00 726/34 |
| 2014/0201851 A1* | 7/2014 | Guo | ... | G09C 1/00 726/34 |
| 2015/0215115 A1* | 7/2015 | Pikus | ... | H04L 9/3278 380/30 |
| 2015/0278505 A1* | 10/2015 | Lu | ... | H04L 9/0866 726/19 |
| 2016/0013940 A1* | 1/2016 | Augustine | ... | H04L 9/0877 380/44 |
| 2017/0134174 A1* | 5/2017 | Cambou | ... | G02B 1/002 |
| 2019/0138753 A1* | 5/2019 | Wallrabenstein | ... | H04L 9/0866 |
| 2019/0165957 A1* | 5/2019 | Abbott | ... | G06F 21/44 |
| 2021/0091952 A1* | 3/2021 | Wentz | ... | H04L 9/3278 |
| 2021/0150690 A1* | 5/2021 | Kohlert | ... | G06V 20/693 |

OTHER PUBLICATIONS

Guneysu, Tim, et al, "Transforming Write Collisions in Block RAMs into Security Application," Field-Programmable Technology, 2009, International Conference, IEEE, Piscataway, NJ, Dec. 9, 2009.

Platonov, Mikhail, et al, "Using Power-Up SRAM State of Atmel ATmega1284P Microcontrollers as Physical Unclonable Function for Key Generation and Chip Identification," Information Security Journal: A Global Perspective, vol. 22, No. 5-6, Nov. 2, 2013.

* cited by examiner

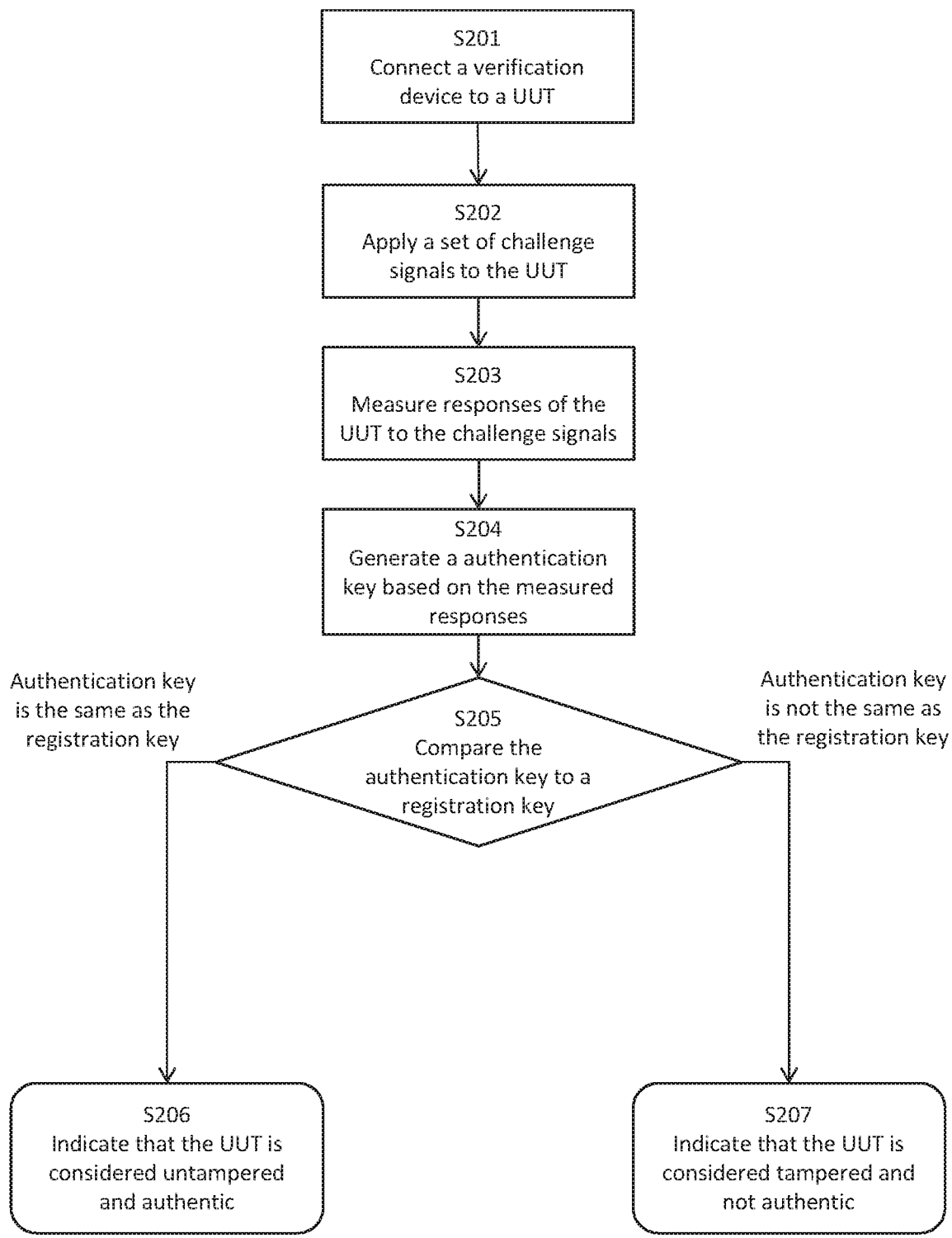

UNIT VERIFICATION METHOD AND DEVICE

RELATED APPLICATION

The present application is a national stage application under 35 U.S.C. § 371 of International Application No. PCT/GB2020/052173, filed 10 Sep. 2020, which claims priority to Great Britain Patent Application No. 1913058.2, filed 10 Sep. 2019. The above referenced applications are hereby incorporated by reference.

BACKGROUND

The present invention relates to a method and device for verifying the authenticity of a unit. The verification method includes a registration method and an authentication method to be performed after a unit has been registered. The invention utilises physically unclonable function (PUF) techniques and has applications within supply chain security, device authentication, counterfeit protection and tamper-proofing.

In manufacturing lines and supply chains, there is often a period of time (or several instances) in which a unit (such as a component or device) is vulnerable to being modified in such a way that the integrity of the unit, and thus an end product, is compromised. By introducing an initial test to each unit and examining it again at an end location, it is possible to detect counterfeit and defective devices prior to their inclusion within larger systems; minimising the risk to that larger system In recent years, manufacturers have been integrating PUF devices into their products in order to provide unique IDs to be tested throughout the supply chain.

PUFs were first proposed with a view to identifying individual integrated circuits (ICs) by their manufacturing tolerances. They map an input (challenge) to an output (response) that is well-defined but difficult to duplicate or reverse-engineer. PUFs work by generating a key that is unique to the device or unit under test (UUT), based on some physical characteristic of the UUT itself. The key is generated and read out by challenging the PUF, measuring the response and then performing some form of computation (typically cryptographic).

As the key is generated by the physical characteristics and manufacturing tolerances of the device, it should be impossible to create a physical copy or accurately model the response of the system to simulate it in software. If some individual attempts to measure the response of the PUF when subject to a challenge, the response should change sufficiently to invalidate the PUF, and protect the secret contained with the PUF. The lack of interchangeability between the challenges and responses leads to the idea of a Challenge-Response Pair (CRP)—each challenge maps directly to one response. The generated response must be reproducible, once variations in environmental conditions such as temperature and humidity are accounted for, and the time to generate a response should be neither too fast (reducing the time required to collect CRPs for a brute force attack) or too slow (reducing the availability of any function relying on the PUF).

In existing authentication and verification methods which employ PUFs, the PUF typically comprises a dedicated Integrated Circuit (IC) which contains a single challenge-response pair. However, these PUFs used for anti-counterfeit or anti-tamper applications can often be removed from the authentic unit and implanted onto a counterfeit unit. They are also vulnerable to being read out from the unit, for example by using physical measurements, and electronically copied into a counterfeit unit. After these procedures, the PUF would appear to output the correct CRPs and key despite the unit having changed.

In scenarios where the impact of a counterfeit unit is marginally reduced performance, such as in smart appliances, the techniques of current PUFs are usually sufficient as the level of effort expended by a potential adversary will typically be low. However, in situations where the effect of counterfeit units could have more significant consequences, such as in aircraft safety systems, these techniques no longer suffice. Therefore, there is a need for a PUF verification method and system which cannot be counterfeited in this manner.

Embodiments of the invention can solve these issues as:
The assembled UUT is itself used as the basis of the identifying key.
Full replication of the UUT is difficult without access to the complete manufacturing data pack. Even with this information, the distribution in manufacturing tolerances will prevent exact replication of a UUT.
Any attempt to move components between genuine and counterfeit articles will change the properties of connections between components and the UUT. For example through the change of solder or contact resistance etc.
The key is derived from analogue properties of the UUT and so it cannot be digitally replicated for simple copying and counterfeiting.

According to a first aspect of the present invention, there is provided a unit registration method to be performed on a unit under test (UUT), the method comprising:
connecting a verification device to the UUT;
applying a set of challenge signals to the UUT, wherein the challenge signals are applied by the verification device;
measuring, using the verification device, responses of the UUT to the challenge signals, wherein the responses are based on the challenge signals and the physical properties of the UUT;
generating a registration key based on the measured responses, wherein the registration key is unique to the UUT;
storing the registration key.

According to a second aspect of the present invention, there is provided a unit authentication method to be performed on a UUT, the method comprising:
connecting a verification device to the UUT;
applying a set of challenge signals to the UUT, wherein the challenge signals are applied by the verification device;
measuring, using the verification device, responses of the UUT to the challenge signals, wherein the responses are based on the challenge signals and the physical properties of the UUT;
generating an authentication key based on the measured responses:
comparing the authentication key to a registration key of the UUT.

According to a third aspect of the invention, there is provided a verification device arranged to perform the method of the first aspect of the invention and/or the method of the second aspect of the invention, the device comprises:
a probing module, connected to a measurement module and configured to connect to a UUT; wherein the measurement module is configured to apply the challenge signals to the UUT and receive the responses from the UUT through the probing module.

The proposed PUF verification method and device utilises the functional circuitry already built into a unit under test to create a token or key, which is unique to the UUT, without needing to include bespoke circuitry for this function. By introducing an initial registration test for each unit, it is possible to detect counterfeit units by performing an authentication test on the unit at a later time.

BRIEF DESCRIPTION OF DRAWINGS

Examples of the present invention will now be described with reference to the accompanying drawings:

FIG. 3 shows a flowchart of an authentication method performed by a verification device.

DETAILED DESCRIPTION OF DRAWINGS

Figure 1:
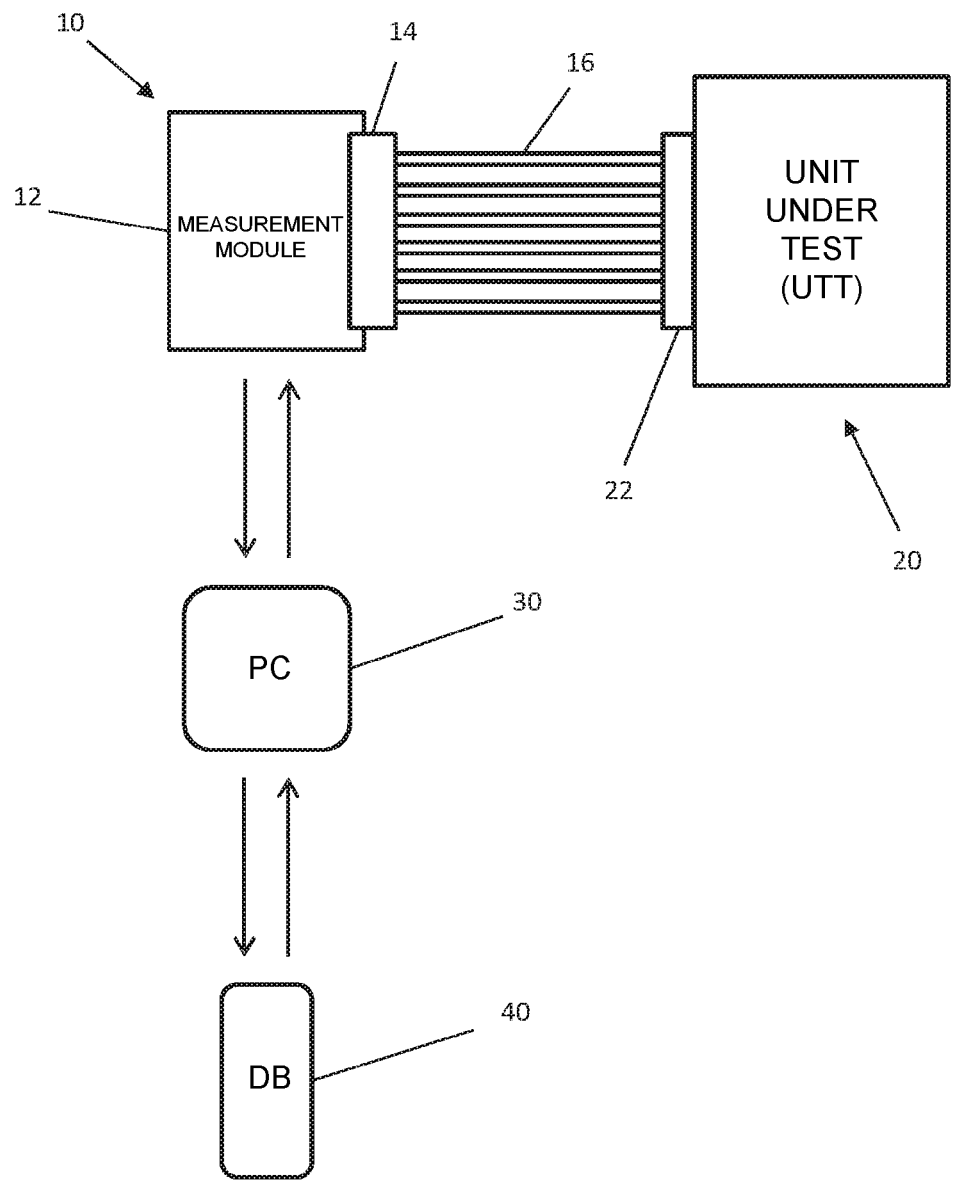
FIG. 1 is a block diagram showing a verification device connected to a unit under test (UUT).

FIG. 1 shows a simplified block diagram of a verification device 10 connected to a unit under test (UUT) 20. In this example, the verification device 10 comprises a measurement module 12 and a probing module 14. The verification device 10 and the UUT 20 are connected by connectors 16 between the probing module 14 of the verification device 10 and the UUT 20. The verification device 10 acts as the control/measurement circuitry for the UUT 20 which acts as a physically unclonable function (PUF) device, applying the challenge and measuring the response which is unique to the given instantiation of the UUT 20.

The measurement module 12 is configured to apply challenge signals to the UUT 20, as well as to receive and measure the responses of the UUT 20 to the applied challenge signals.

The verification device 10 and/or measurement module 12 may be configured to apply only a single set of challenge signals or the verification device 10 may be configured to apply multiple, varying sets of challenge signals.

The UUT 20 may be any unit for which unit verification is beneficial, or where the impact of counterfeiting is high, such as a component in a supply chain or manufacturing process. For example, the UUT 20 may be a complete product, set of sub-assemblies, or a system of systems. The UUT 20 may comprise a PCB with inbuilt receivers 22, such as a backplane connector or port, to assist connecting with a verification device 10. It is the inherent manufacturing tolerances of individual components of the UUT 20, along with variations in the placement of these components and the tracks between them, which lead to the generation of a unique response, even if the same challenge is applied to another UUT 20 of identical design.

In the example of FIG. 1, the probing module 14 is generic and UUT agnostic, while the connectors 16 are specifically configured to couple with the UUT 20. Alternatively, the probing module 14 may be configured to directly connect to the UUT 20 without any additional connectors being required. For example, the probing module 14 may comprise a bed of nails tester configured to make contact with, and connect to, the UUT 20.

In a preferred embodiment, the verification device 10 is in communication with a trusted PC 30 which sends and receives information to and from the device. The trusted PC 30 generates registration and/or authentication keys based on the responses measured by the measurement module. The trusted PC 30 is also in communication with a secure server or database 40 which stores any generated registration key(s), as well as the challenge sequence(s) applied to the UUT 20 to generate the registration key(s).

In some embodiments of the invention, the verification device 10 further comprises a generation module 18 configured to generate a registration key and/or an authentication key. If the key is generated by the verification device 10, there remains a requirement for this key to be transferred to the secure server or database 40 for remote verification at a later point.

Figure 2:
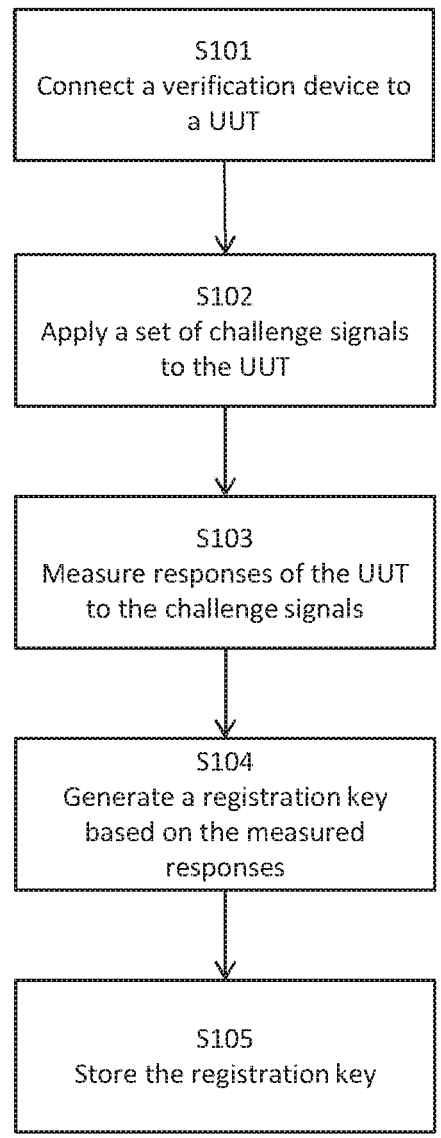
FIG. 2 shows a flowchart of a registration method performed by a verification device.

FIG. 2 shows a flowchart outlining a unit registration method performed by a verification device 10 on a unit under test (UUT) 20.

The registration method is performed when a device unique key is to be created for the first time. This could be at the point of manufacture or at the last point of trust in a supply chain.

The registration method may also be used later, for example when the unit has been integrated into a system which is itself to be shipped as part of the supply chain. In this case the physical properties of the unit may have changed due to the integration process and so an authentication technique performed would not generated an authentication key the same as the original registration key. If this is the case, a new registration key is required to avoid counterfeiting.

S101: The verification device 10 is connected to the UUT 20. The connection may be established directly between the verification device 10 and the UUT 20 or through a number of intermediary components and/or modules with known effects on the response measured by the verification device 10.

In some embodiments, connecting the verification device 10 to the UUT 20 comprises electrically connecting the verification device 10 to the UUT 20.

S102: The verification device 10 applies a set of challenge signals to the UUT 20. The set of challenge signals are applied through the connection established in S101 and may include any number of individual challenge signals. These challenge signals may be in the form of, for example, electric signals, magnetic signals, optical signals, acoustic signals or another type of signal.

Preferably, challenge signals applied to the UUT 20 during the registration method are applied over the expected range of environmental conditions anticipated at a later authentication stage.

A single registration key is generated which should be reproducible over the full range of environmental conditions. It is generated by passing the measured response from the UUT through a helper-data algorithm (e.g. fuzzy key+ entropy extractor). This algorithm may be implemented such that it will reproduce the correct key without knowledge of the current environmental conditions, or may alternatively require additional input of temperature etc. to facilitate key reconstruction. The registration process is performed over the full range of environmental conditions to train this reconstruction algorithm to reproduce the key over the full environmental range.

Properties of the challenge signals may be varied between different challenge signals of the set of challenge signals. These varying properties can be, for example, the waveform, frequency, amplitude and/or phase of the challenge signal.

If the verification device 10 and the UUT 20 are electrically connected, the challenge signals applied by the verification device 10 may comprise electrical signals. These electrical signals can be applied to a selection of conductors of the UUT 20, and the selection of conductors which have electrical signals applied to them may vary between challenge signals in the set of challenge signals.

In some embodiments, the challenge signals applied by the verification device 10 may comprise optical signals. These embodiments employ light sources to generate the optical signals, optical waveguides to transmit them, and light sensors to measure the response. The use of optical signals may be dependent on the UUT. If the UUT is a transmitter module, an electrical challenge signal might be applied to the UUT, and an optical signal measured as the response. Conversely, if the UUT is a receiver, the challenge signal would be optical, and the response signal electrical in nature S103: The verification device 10 measures the responses of the UUT 20 to the challenge signals, wherein these responses are based on the challenge signals and the physical properties of the UUT 20.

These measurements are made using the connection established in S101 and the type of measurement will vary on the nature of the UUT 20. These measurements may include, by way of example, bulk (de-coupling) capacitance, switching frequencies (and variations within) and ripple currents for UUTs with power management capabilities; small-signal coupling between specific pins on Integrated Circuits and rise-times on sensitive mixed-signal circuits. When optical properties are examined as part of the method, the verification device may measure, by way of example, the peak wavelength and rise time of the response.

These measurements may be performed in isolation, or in combination with one another. The response to a specific applied challenge signal may be measured before a subsequent signal in the set is applied, or measured as multiple challenge signals from the set are simultaneously applied to the UUT.

A higher quantity of responses measured during the registration process allows for the generation of a larger number of registration keys for the UUT, preventing a simple replay style attack from being performed. Similarly, the use of an increased number of responses obfuscates the critical information used in the generation of the registration key, increasing the security of the token.

S104: A registration key is generated based on the responses measured in step S103. The registration key generated will be unique to the UUT 20 the registration method is performed on.

The registration key may be generated by the verification device 10 itself or the verification device 10 may transfer the data from the measured responses to another device, such as a trusted PC 30, which generates the registration key.

It is the inherent variations between identical UUT designs, such as component placement and tolerances, which ensure that each UUT 20 can have a unique registration key.

The registration key may be generated using cryptographic algorithms or methods. For example, a fuzzy key extractor may be applied to the collected measurements to form a registration key with sufficient entropic value to be used as a UUT identifier.

S105: The registration key is stored. Once a registration key for identifying the UUT 20 has been generated, it is then stored for later comparison when authenticating and verifying the UUT 20. Preferably, the registration key is stored within a secure database or server 40.

Multiple registration keys may be generated and stored for the same UUT 20, each evaluated over the full environmental condition range, such that no key is ever re-used. Such methods reduce the efficacy of replay attacks by requiring knowledge of the authentication request string to produce the correct ID token.

FIG. 3 shows a flowchart outlining a unit authentication method performed by a verification device 10 on a unit under test (UUT) 20. Several steps of the authentication method correspond to steps of the registration method described above. For these corresponding steps, the more detailed implementations and explanations are also applicable to the steps of the authentication method. To avoid repetition, these will not be recited again in detail.

The authentication method can be performed any time the UUT 20 is to be verified. For example, this may be before integration into a more complex system, at the end of a supply chain, or at any stage past the last point of trust in a supply chain.

S201: The verification device 10 is connected to the UUT 20. The details and implementation described in relation to S101 may also be applied to S201.

Furthermore, preferably, the verification device 10 is connected to the UUT 20 in the same arrangement and configuration as in any registration method previously performed on the UUT 20, even if, as will often be the case, the verification device 10 is not the same device that was used for registration.

S202: The verification device 10 applies a set of challenge signals to the UUT 20. The details and implementation described in relation to S102 may also be applied to S202.

Furthermore, preferably, the challenge signals applied by the verification device 10 are authentication challenge signals. These authentication challenge signals are the same as registration challenge signals, corresponding to a registration key of the UUT 20, applied as part of a registration method performed on the UUT 20.

S203: The verification device 10 measures the responses of the UUT 20 to the challenge signals, wherein these responses are based on the challenge signals and the physical properties of the UUT 20. The details and implementations described in relation to S103 may also be applied to S203.

S204: An authentication key is generated based on the responses measured in step S203.

The authentication key may be generated by the verification device 10 itself or the verification device 10 may transfer the data from the measured responses to another device, such as a trusted PC 30, which generates the authentication key. The authentication key may be generated using cryptographic algorithms or methods. For example, a fuzzy key extractor may be applied to the collected measurements to form the authentication key.

Preferably, the authentication key is generated using the same processes as those used in the generation of a registration key during a registration method previously performed on the UUT 20.

S205: The authentication key is compared to a registration key of the UUT 20. If the UUT 20 being authenticated is the same as the UUT 20 previously registered, and if the UUT 20 has not been altered or tampered with, then the authentication key generated in S204 will be the same as the registration key of the UUT 20.

The registration key used for comparison may be recovered from its storage location 40 at any point after the verification device 10 is connected to the UUT 20 and before the registration and authentication keys are compared.

If the authentication key is the same as the registration key, perform step S206. However, if the authentication key is not the same as the registration key, perform step S207.

S206: Indicate that the UUT 20 is considered untampered and authentic.

S207: Indicate that the UUT 20 is considered tampered and not authentic.

A variety of factors could lead to the authentication key generated being different to the registration key. For example, if the UUT 20 has been counterfeited, or modified then this will cause the responses of the UUT 20 to change from those measured during the registration process.

In some embodiments of the invention, the unit authentication method may also include the step of determining whether the UUT 20 has a corresponding registration key. This step can be performed at any stage of the authentication method after connecting the verification device 10 to the UUT 20 and before the keys are compared.

A unit verification method includes both the unit registration method, described above in relation to FIG. 2, and the unit authentication method, described above in relation to FIG. 3.

In a preferred unit verification method, the set-up and execution of the registration method and authentication methods are identical. More specifically, this means that a verification device 10 is connected to a UUT 20 in the same arrangement in the authentication method as it was in the registration method. Having specific connectors for a given type of UUT 20 may help ensure the connection is repeatable registration and any subsequent authentication processes. The set of challenge signals applied to the UUT 20, and the manner of key generation (i.e. using a fuzzy-key extractor) will also be identical for both the registration and authentication methods. Preferably, the verification device 10 used in an authentication method for a given UUT 20 will be an identical copy of, the verification device 10 used in the registration device for that same UUT 20. A calibration process will be required, however, to account for the manufacturing tolerances/differences between verification devices.

Measurement of passive components of a UUT 20 provides a good indication of the unit authenticity. However, in some embodiments of the invention, the security may be improved by incorporating specific identification elements within the UUT 20, for example RF couplers on internal layers of a PCB.

A known "reference" UUT 20 may be stored for use with a verification device 10 to account for long term effects (i.e. measurement circuitry drift) by calibrating out certain variables such as age and temperature.

When generating a registration or authentication key, in the absence of a fuzzy key extractor algorithm, an alternative is to use the measured responses of a single, critical, property of the UUT 20 in conjunction with a machine learning algorithm for pattern recognition and classification.

The invention claimed is:

1. A unit registration method to be performed on a unit under test (UUT) by a verification device, the unit registration method comprising:
   connecting the verification device to the UUT;
   applying a set of challenge signals to a plurality of conductors of the UUT by the verification device,
      wherein the set of challenge signals are applied by the verification device to a varying selection of the plurality of conductors of the UUT, and
      wherein the varying selection of the plurality of conductors varies between each challenge signal within the set of challenge signals;
   receiving response signals from the UUT in response to the set of challenge signals;
   measuring electro-magnetic responses of the response signals,
      wherein the electro-magnetic responses are based on challenge signals within the set of challenge signals and physical properties of the UUT;
   generating a registration key based on the electro-magnetic responses measured by the verification device,
      wherein the registration key is unique to the UUT; and
   storing the registration key.

2. The unit registration method of claim 1, wherein measuring the electro-magnetic responses of the UUT comprises measuring electrical or optical responses of the UUT by the verification device.

3. The unit registration method of claim 2, wherein the verification device is optically connected to the UUT, and wherein the challenge signals applied by the verification device comprise optical signals.

4. The unit registration method of claim 3, wherein the UUT comprises a plurality of optical waveguides such that the set of challenge signals are applied by the verification device to a varying selection of the plurality of optical waveguides of the UUT, and wherein the varying selection of the plurality of optical waveguides varies between each challenge signal within the set of challenge signals.

5. The unit registration method of claim 1, wherein at least one of a waveform, a frequency, an amplitude, and a phase of a challenge signal varies between the challenge signals within the set of challenge signals.

6. The unit registration method of claim 1, wherein the registration key is generated using a fuzzy extractor.

7. A unit authentication method to be performed on a unit under test (UUT) by a verification device, the unit authentication method comprising:
   connecting the verification device to the UUT;
   applying a set of authentication challenge signals to a plurality of conductors of the UUT by the verification device,
      wherein the set of challenge signals are applied by the verification device to a varying selection of the plurality of conductors of the UUT, and
      wherein the varying selection of the plurality of conductors varies between each challenge signal within the set of challenge signals;
   receiving response signals from the UUT in response to the set of authentication challenge signals;
   measuring the response signals, wherein the response signals are based on challenge signals within the set of authentication challenge signals and physical properties of the UUT;
   generating an authentication key based on the response signals measured by the verification device; and
   comparing the authentication key to a registration key of the UUT, wherein the verification device recovers the registration key from a storage location.

8. The unit authentication method of claim 7, wherein after comparing the authentication key to the registration key, the unit authentication method further comprises:
   determining, by the verification device, that the UUT is considered untampered and authentic when the authentication key matches the registration key; or determining, by the verification device, that the UUT is considered tampered and not authentic when the authentication key does not match the registration key.

9. The unit authentication method of claim 7, wherein the set of authentication challenge signals are identical to a set of registration challenge signals corresponding to the registration key of the UUT.

10. The unit authentication method of claim 7, wherein the verification device is electrically connected to the UUT, and wherein the set of authentication challenge signals are electrical signals.

11. The unit authentication method of claim 10, wherein the UUT comprises a plurality of conductors such that a plurality of authentication challenge signals within the set of authentication challenge signals are applied by the verification device to a varying selection of the plurality of conductors of the UUT, and wherein the varying selection of the plurality of conductors varies between each of the plurality of authentication challenge signals within the set of authentication challenge signals.

12. The unit authentication method of claim 7, wherein the verification device is optically connected to the UUT, and wherein the set of authentication challenge signals are optical signals.

13. The unit authentication method of claim 12, wherein the UUT comprises a plurality of optical waveguides such that a plurality of authentication challenge signals within the set of authentication challenge signals are applied to a varying selection of the plurality of optical waveguides of the UUT, and wherein the varying selection of optical waveguides varies between authentication challenge signals within the set of authentication challenge signals.

14. The unit authentication method of claim 7, wherein at least one of a waveform, a frequency, an amplitude and a phase of an authentication challenge signal varies between authentication challenge signals of the set of authentication challenge signals.

15. The unit authentication method of claim 7, wherein the authentication key is generated using a fuzzy extractor.

16. A unit verification and authentication method performed on a unit under test (UUT) by a verification device, the unit verification and authentication method comprising:
  a unit registration method comprising:
    connecting the verification device to the UUT;
    applying a set of registration challenge signals to a plurality of conductors of the UUT by the verification device,
      wherein the set of challenge signals are applied by the verification device to a varying selection of the plurality of conductors of the UUT, and
      wherein the varying selection of the plurality of conductors varies between each challenge signal within the set of challenge signals;
    receiving response signals from the UUT in response to the set of registration challenge signals;
    measuring the response signals, wherein the response signals are based on challenge signals within the set of registration challenge signals and physical properties of the UUT;
    generating a registration key based on the response signals measured by the verification device, wherein the registration key is unique to the UUT; and
    storing the registration key; and
  a unit authentication method comprising:
    connecting the verification device to the UUT;
    applying a set of authentication challenge signals to the plurality of conductors of the UUT by the verification device,
      wherein the set of challenge signals are applied by the verification device to the varying selection of the plurality of conductors of the UUT, and
      wherein the varying selection of the plurality of conductors varies between each challenge signal within the set of challenge signals;
    receiving response signals from the UUT in response to the set of authentication challenge signals;
    measuring the response signals received by the verification device, wherein the response signals are based on the set of authentication challenge signals and the physical properties of the UUT;
    generating an authentication key based on the response signals measured by the verification device, wherein the registration key is unique to the UUT; and
    comparing the authentication key to the registration key.

17. The unit verification and authentication method of claim 16, wherein a connection arrangement between the verification device and the UUT in the unit authentication method is identical to the connection arrangement in the unit registration method.

18. The unit verification and authentication method of claim 16, wherein the verification device comprises:
  a probing module connected to a measurement module and configured to connect to the UUT;
    wherein the measurement module is configured to:
    apply the set of registration challenge signals and the set of authentication challenge signals to the UUT and
    receive the response signals from the UUT through the probing module.

19. The unit verification and authentication method of claim 18, wherein the verification device further comprises a generation module configured to generate the registration key and the authentication key.

20. The unit verification and authentication method of claim 19, wherein the probing module comprises a bed of nails tester.

* * * * *